(12) United States Patent
Durocher et al.

(10) Patent No.: US 8,083,940 B2
(45) Date of Patent: Dec. 27, 2011

(54) OIL STRAINER FOR A GAS TURBINE ENGINE

(75) Inventors: Eric Durocher, Vercheres (CA); Guy Lefebvre, St. Bruno (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 843 days.

(21) Appl. No.: 11/466,162

(22) Filed: Aug. 22, 2006

(65) Prior Publication Data
US 2008/0047888 A1    Feb. 28, 2008

(51) Int. Cl.
*B01D 29/085* (2006.01)
*B01D 29/17* (2006.01)
*B01D 29/37* (2006.01)

(52) U.S. Cl. ........................ 210/232; 210/448

(58) Field of Classification Search ............... 210/232, 210/448
See application file for complete search history.

(56) References Cited

U.S. PATENT DOCUMENTS

| | | | | |
|---|---|---|---|---|
| 417,127 | A | * | 12/1889 | Williams ................ 210/448 |
| 2,247,040 | A | * | 6/1941 | Whitsett ................ 210/238 |
| 2,384,057 | A | * | 9/1945 | Wetherell ............... 210/489 |
| 3,332,557 | A | * | 7/1967 | Pall ..................... 210/495 |
| 3,592,768 | A | * | 7/1971 | Parker .................. 210/495 |
| 3,749,250 | A | * | 7/1973 | Oldford ................. 210/448 |
| 4,052,315 | A | * | 10/1977 | Lindsay et al. ........... 210/232 |
| 4,149,974 | A | | 4/1979 | Bolton et al. |
| 4,495,073 | A | * | 1/1985 | Beimgraben ............. 210/448 |
| 5,536,402 | A | * | 7/1996 | Kluhsman ............... 210/232 |
| 5,632,793 | A | * | 5/1997 | Haggard ................ 55/498 |
| 6,821,422 | B1 | | 11/2004 | Brzozowski et al. |

* cited by examiner

*Primary Examiner* — Thomas M Lithgow
(74) *Attorney, Agent, or Firm* — Norton Rose OR LLP

(57) ABSTRACT

The oil strainer has a filtering portion and a flexible sleeve portion to which the filtering portion is connected. The flexible sleeve portion has a plurality of spigot-receiving slots on the upstream side of the strainer.

3 Claims, 2 Drawing Sheets

OIL STRAINER FOR A GAS TURBINE ENGINE

TECHNICAL FIELD

The invention relates to an oil strainer, and in particular to an improved oil strainer for use in a pressurized oil circuit of a gas turbine engine.

BACKGROUND

Oil strainers are generally used to prevent solid debris larger than a certain size from reaching a device to which the oil is provided, for instance a bearing. In the past, oil strainers used in gas turbine engines typically included a machined ring welded to a mesh. The oil strainers were held in their seat using a removable fastener, such as a snap ring. Oil strainers must maintain a leak-tight seal with their seat to prevent unfiltered oil from by-passing them, which leak would potentially result in some solid debris reaching the device. A leak may also occur if the strainer is re-installed in its seat without the proper orientation during maintenance.

Overall, it was desirable to provide an improved oil strainer that is simple to manufacture and to install in its seat.

SUMMARY

In one aspect, the present concept provides an oil strainer for a gas turbine engine, the oil strainer having an upstream side and a downstream side, and comprising a filtering portion and a flexible sleeve portion to which the filtering portion is connected, the flexible sleeve portion having at least one spigot-receiving slot on the upstream side of the strainer.

In another aspect, the present concept provides an oil strainer assembly for use in a gas turbine engine, the gas turbine engine including an oil tube coupling having a conduit portion, a shoulder portion inside the conduit portion and at least one spigot projecting inside the conduit portion at a location upstream the shoulder portion, the assembly comprising an oil strainer insertable into a seat formed by the conduit portion, the shoulder portion and the at least one spigot, the oil strainer including a flexible sleeve portion with at least one slot configured and disposed to receive the corresponding at least one spigot when the oil strainer is fully seated.

In a further aspect, the present concept provides a method of installing an oil strainer in a corresponding oil tube coupling provided in a gas turbine engine, the oil strainer including a flexible sleeve portion, the method comprising: flexing the flexible sleeve portion; and pushing the oil strainer into a fully seated position where one end of the flexible sleeve portion abuts a shoulder portion inside the oil tube coupling and an opposite end of the flexible sleeve portion has at least one slot to receive a corresponding spigot projecting from inside the oil tube coupling.

Further details of these and other aspects of the improved oil strainer will be apparent from the detailed description and figures included below.

BRIEF DESCRIPTION OF THE FIGURES

For a better understanding and to show more clearly how it may be carried into effect, reference will now be made by way of example to the accompanying figures, in which.

DETAILED DESCRIPTION

Figure 1:
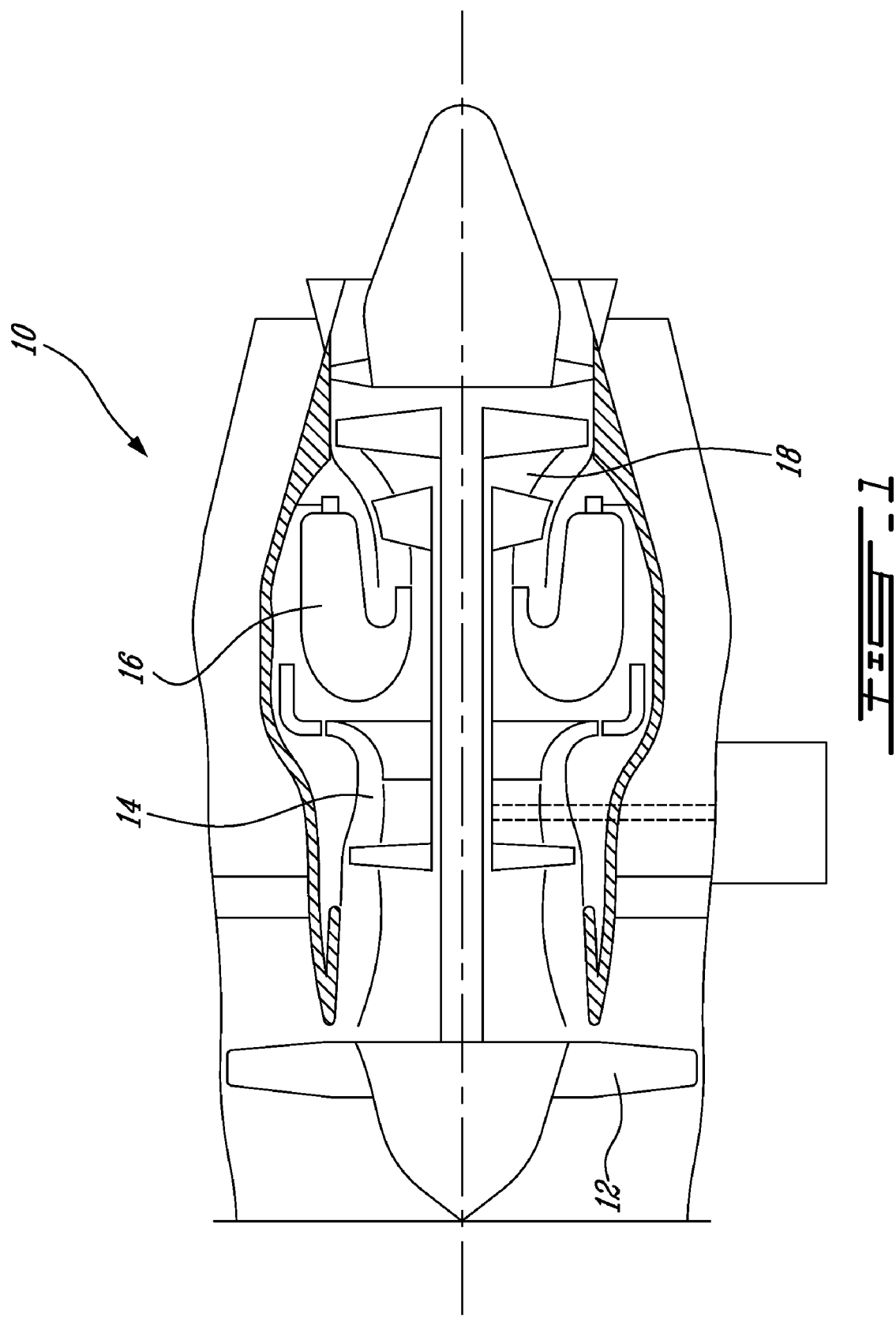
FIG. 1 schematically shows a generic gas turbine engine to illustrate an example of a general environment in which the improved oil strainer can be used.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. FIG. 1 only shows one example of the general environment in which the improved oil strainer can be used. The improved oil strainer can be used with other turbofan models or other kinds of gas turbine engines, such as turboprop or turboshaft engines.

Figure 2:
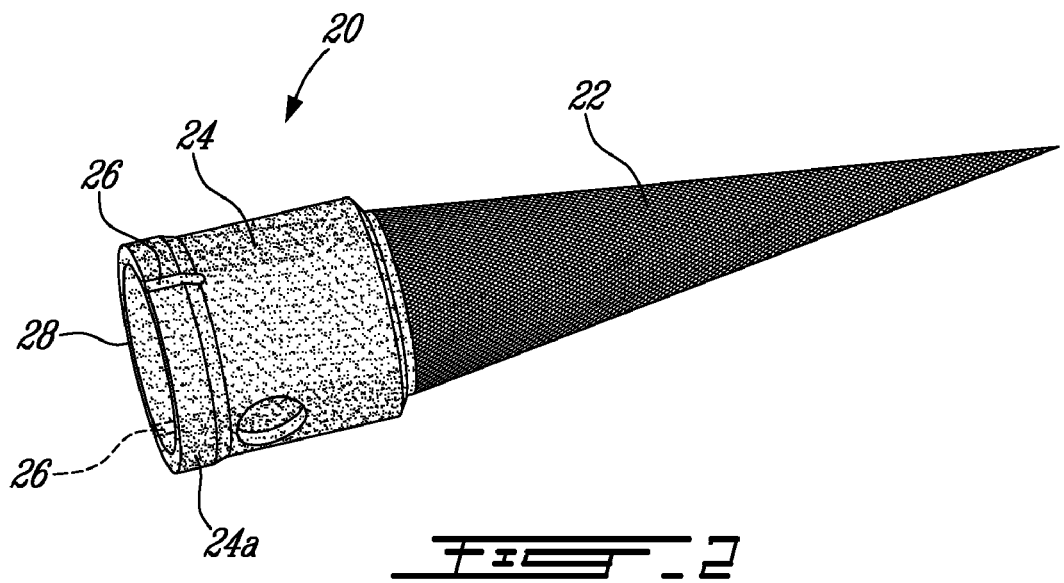
FIG. 2 is a perspective view of an example of an improved oil strainer.

Referring now to FIG. 2, there is shown an example of an oil strainer 20 as improved. This oil strainer 20 includes a filtering portion 22 and a flexible sleeve portion 24 to which the filtering portion 22 is connected. The oil strainer 20 is also preferably symmetrical around a central axis.

In the embodiment illustrated in FIG. 2, the filtering portion 22 is somewhat funnel-shaped and projects in direction of the downstream side, thus the same direction as the oil flows. The flexible sleeve portion 24 can be made of using a thin metallic sheet shaped as required.

The flexible sleeve portion 24 has a plurality of spigot-receiving slots 26 on the upstream side 28 of the oil strainer 20. These slots 26 are designed to maintain the connection between the oil strainer 20 and spigots provided in an oil tube coupling when the oil strainer 20 is fully seated. In the illustrated embodiment, the slots 26 are only at the outer surface of the flexible sleeve portion 24. They can also be from one side of the flexible sleeve portion 24 to another. Also, the upstream side 28 of the oil strainer 20 is enlarged in the illustrated embodiment. The slots 26 are two in number and are opposite each other. The slots 26 have a substantially rectangular cross section.

Figure 3:
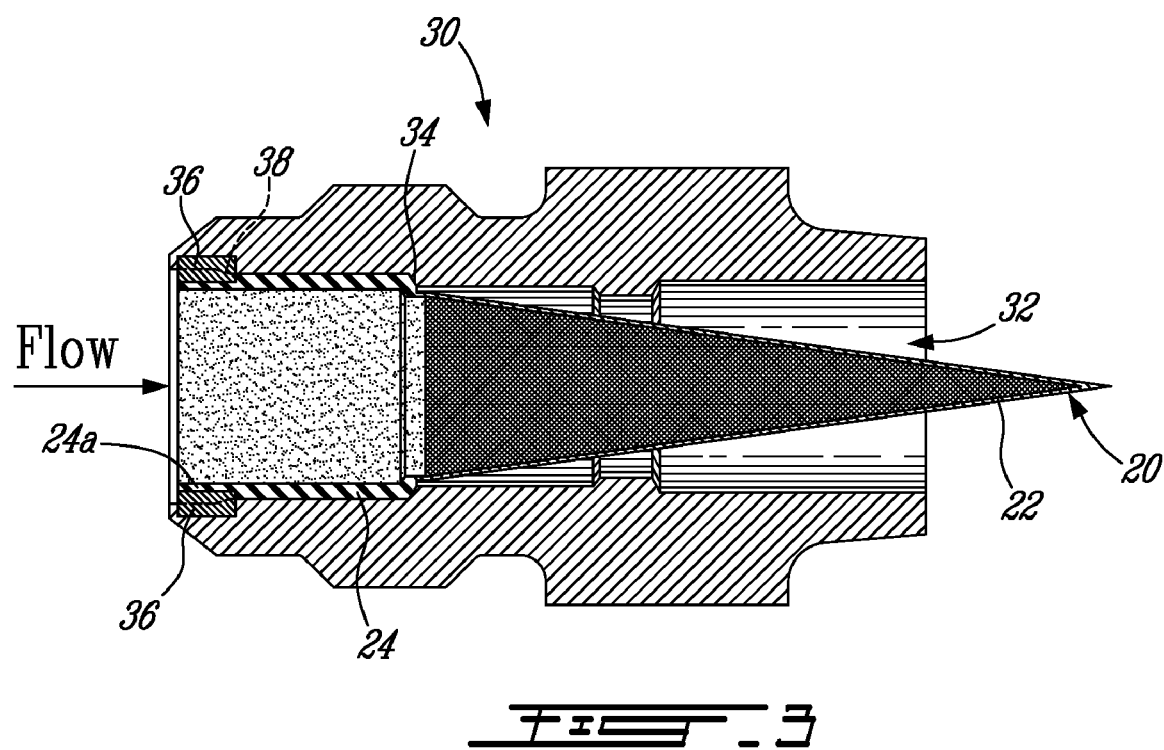
FIG. 3 is a cross-sectional view showing an example of an oil tube coupling in which the improved oil strainer of FIG. 2 is installed.

FIG. 3 shows the oil strainer 20 of FIG. 2 when fully seated in an oil tube coupling 30. The expression "oil tube coupling" generically and broadly refers to a location of the pressurized oil circuit where an oil strainer can be used in a gas turbine engine. The illustrated oil tube coupling 30 comprises a conduit portion 32 and a shoulder portion 34 inside the conduit portion 32. Spigots 36 are provided inside the conduit portion 32. The number of slots 26 in the flexible sleeve portion 24 is equal to the number of spigots 36. There is thus two spigots 36 opposite each other with reference to the conduit portion 32. The spigots 36 have a substantially rectangular cross section and a portion of the spigots 36 is attached within the oil tube coupling 30.

In use, to install the oil strainer 20, the flexible sleeve 24 portion is slightly inwardly flexed so as to pass between the spigots 36. The edge of the flexible sleeve portion 24 on the downstream side will eventually reach the shoulder portion 34 of the oil tube coupling 30. The oil strainer 20 is shaped to abut against the shoulder portion 34 of the oil tube coupling 30 while the radial spigots 36 are set into their respective slots 26 once the oil strainer 20 is fully inserted into its seat. The flexible sleeve portion 24 is designed to have a tight fit inside the conduit portion 32. The friction generated between the flexible sleeve portion 24 and the conduit portion 32 increases the retention of the oil strainer 20. The slots 26 may also be sized to have a tight fit with the spigots 36 so as to create additional friction between them in the resulting assembly.

In the illustrated embodiment, the upstream side 28 of the oil strainer 20 has an enlarged external rim 24a that rests against a corresponding front shoulder 38.

The above description is meant to be exemplary only, and one skilled in the art will recognize that other changes may also be made to the embodiments described without departing from the scope of the invention disclosed as defined by the appended claims. For instance, the present invention is not limited to oil strainers used with bearings. The strainer can be located upstream another kind of device, such us a pump, a valve, etc. The oil strainer can have a different shape than the model illustrated herein. In particular, the shape of the filtering portion can vary greatly from what is shown. The oil strainer is not necessarily symmetrical around the central axis. For instance, some oil strainers can be somewhat oval or have asymmetrical slots to accommodate asymmetrical spigots. The number of spigots can be only one or be more than two. Also, the spigots are not necessarily identical or located at the same axial position in the same oil tube coupling. Still other modifications which fall within the scope of the present invention will be apparent to those skilled in the art, in light of a review of this disclosure, and such modifications are intended to fall within the appended claims.

What is claimed is:

1. An oil strainer assembly for use in a gas turbine engine, the gas turbine engine including an oil tube coupling having a conduit portion, a shoulder portion inside the conduit portion and at least one spigot projecting inside the conduit portion at a location upstream the shoulder portion, the assembly comprising an oil strainer insertable into a seat formed by the conduit portion, the shoulder portion and the at least one spigot, the oil strainer including a flexible sleeve portion with at least one slot configured and disposed to receive the corresponding at least one spigot when the oil strainer is fully seated.

2. The oil strainer assembly as defined in claim 1, wherein the flexible sleeve portion has an enlarged rim resting against a corresponding shoulder in the conduit portion.

3. A method of installing an oil strainer in a corresponding oil tube coupling provided in a gas turbine engine, the oil strainer including a flexible sleeve portion, the method comprising:

flexing the flexible sleeve portion; and pushing the oil strainer into a fully seated position where one end of the flexible sleeve portion abuts a shoulder portion inside the oil tube coupling and an opposite end of the flexible sleeve portion has at least one slot to receive a corresponding spigot projecting from inside the oil tube coupling.

* * * * *